March 20, 1934.  L. M. ELLISON  1,951,603
PRESSURE GAUGE
Filed July 12, 1930  2 Sheets-Sheet 1
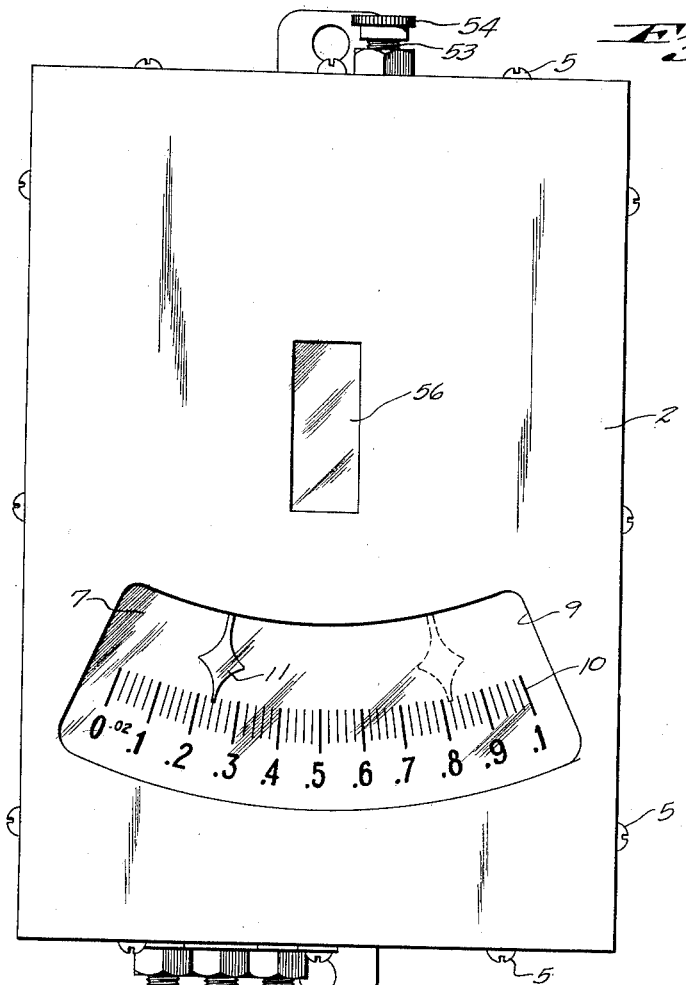
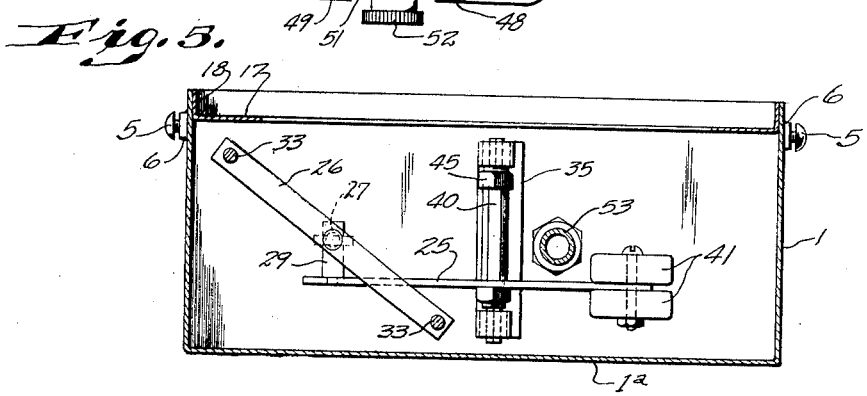
INVENTOR.
LEWIS M. ELLISON.
BY
ATTORNEYS.

March 20, 1934.　　　L. M. ELLISON　　　1,951,603
PRESSURE GAUGE
Filed July 12, 1930　　　2 Sheets-Sheet 2
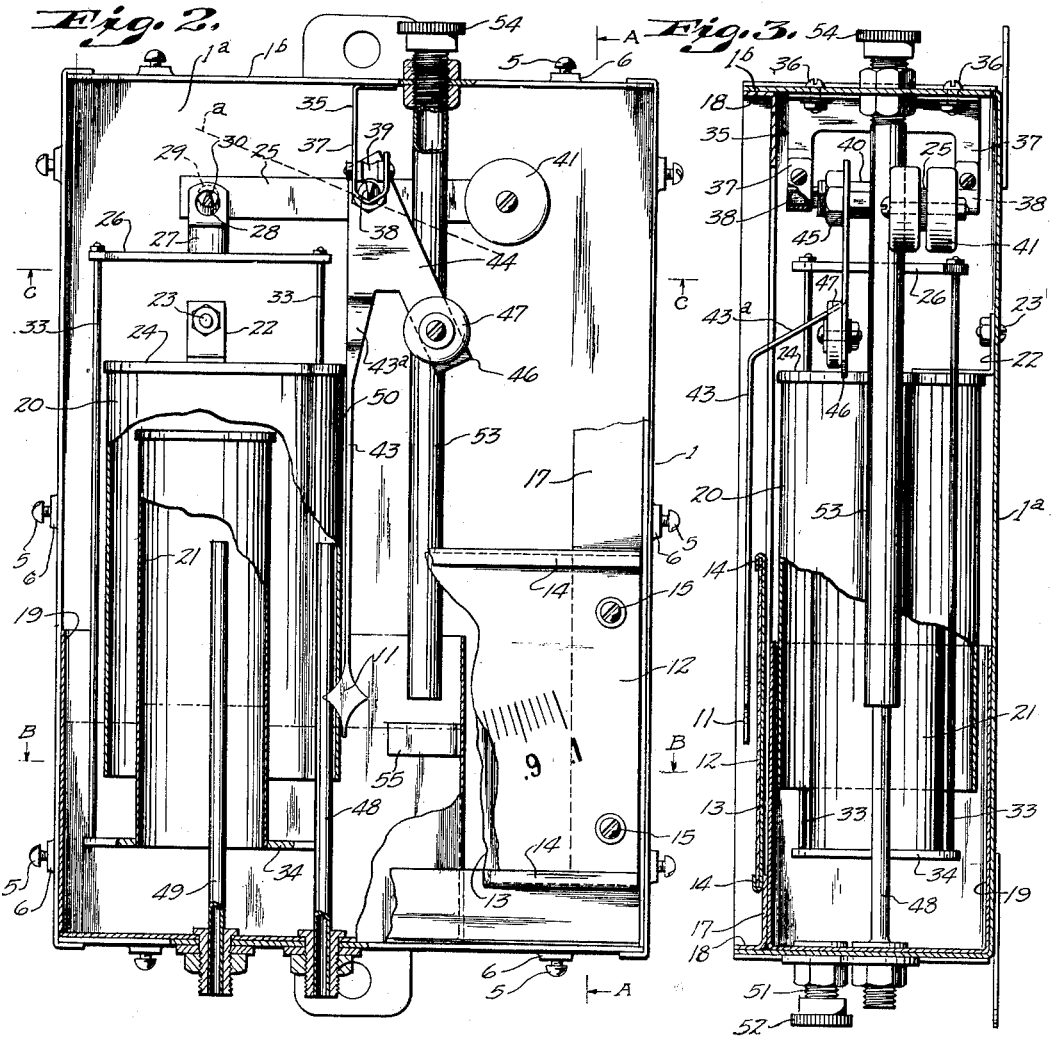
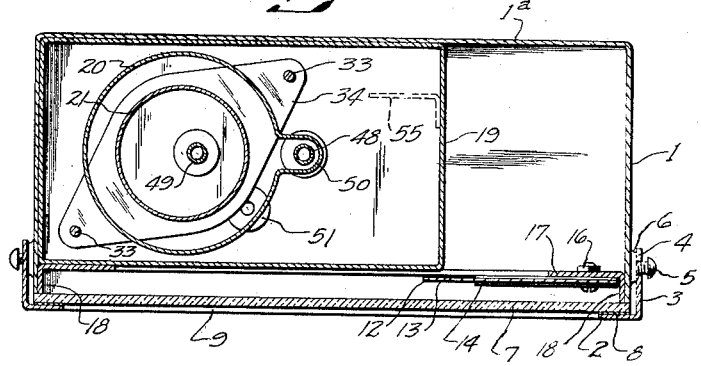
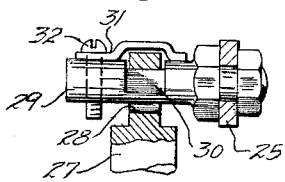
INVENTOR.
LEWIS M. ELLISON.
BY
ATTORNEYS.

Patented Mar. 20, 1934

1,951,603

UNITED STATES PATENT OFFICE 1,951,603

PRESSURE GAUGE

Lewis M. Ellison, Evanston, Ill.

Application July 12, 1930, Serial No. 467,411

4 Claims. (Cl. 73—31)

This invention relates to pressure gauges and more particularly to gauges for indicating pressure differences, minus or plus, between two given sources of pressure, as in furnace draft systems, across economizers, pre-heaters, through air filters, and all other equipment in which the resistances of air or gas flow are to be indicated.

The main object of my invention is to provide the power unit of the gauge in the form of a pressure responsive means, the movement of which is effected by a differential pressure on opposite sides of said means, and which movement is translated to the pointer or other indicator of the gauge.

Another object of my invention is to locate the pressure responsive element of the power unit in a hermetically sealed housing, so that the unit by which a differential pressure is indicated may be located to one side of the axis about which the pointer has movement.

A further object of my invention is to provide the housing and the movable element in the form of two sealed gasometer bells arranged one within the other.

A further object of my invention is to have the bell which forms the housing for the movable element stationary with means whereby the interiors of the bells may be connected with the sources of pressure, the difference between which is to be indicated by the gauge.

A further object of my invention is to so connect the bells with the two sources of pressure that the lower absolute pressure acts on the movable bell on the inside and the higher absolute pressure acts on the movable bell on the outside, the two pressures acting on the head of the movable bell to raise or lower the same depending on the pressure difference existing on opposite sides of the head.

The invention also consists in the mechanical movement embodied in the power unit as well as specific structure and arrangement of parts hereinafter described and shown in the accompanying drawings, in which:

Fig. 1 is a front view of a gauge embodying a differential pressure movement constructed in accordance with my invention;

Fig. 2 is a vertical sectional view, with parts in elevation, taken through the gauge;

Fig. 3 is a vertical sectional view taken on line A—A of Fig. 2;

Fig. 4 is a horizontal sectional view taken on line B—B of Fig. 2;

Fig. 5 is a similar sectional view taken on line C—C of Fig. 2; and

Fig. 6 illustrates a detail of construction to be hereafter described.

In the drawings, 1 indicates the outer casing of the gauge and 2 indicates the removable cover over the front of the same. The cover may have the desired detachable connection with the casing, so that the cover may be applied to the casing after the gauge parts have been assembled and arranged therein or removed whenever necessary to have access into the case. In the drawings, the form of detachable connection shown comprises a marginal flange 3 on the cover, which flange fits over the outside of the casing about the open front of the same. Said flange is provided with slots 4 to receive screws 5 threaded into bosses 6 on the outer sides of the casing to secure the cover in place. A transparent plate 7, preferably of glass, fits over the entire front of the casing and is clamped against the same by the cover with a suitable gasket 8 between them as shown in Fig. 4.

The cover 2 is provided with a sight opening 9, through which is visible the scale 10 and the pointer 11 of the gauge structure, these parts being within the casing to the rear of the transparent plate 7. The scale 10 is graduated in the manner required for the particular use for which the gauge is employed, and the graduations are arranged in an arc of a circle, defined by the movement of the pointer. The scale 10 is preferably marked on a sheet of cardboard or other suitable material 12 mounted on a metal plate 13, the upper and lower margins of which are bent over at 14, 14 to secure the scale strip in place as shown in Fig. 2. The scale strip and its mounting plate are secured in place in the gauge by a number of screws 15, 15, which are threaded into bosses 16, carried by a supporting frame 17. The frame has marginal flanges 18, which fit inside of the marginal walls of the casing 1 and are rigidly secured thereto by rivets (not shown).

The operating mechanism of the gauge is located in the casing 1 to the rear of the frame 17 and includes an upwardly opening tank or reservoir 19 situated on the bottom wall of the casing 1 and designed to hold the required amount of liquid such as oil, to provide the desired liquid seal for the lower ends of the gasometer bells 20, 21, as shown in Figs. 2 and 3. These bells are arranged one within the other, the bell 20 being the outer bell and the bell 21 being the inner bell. In the particular form of structure shown, the outer bell 20 is stationary, being fastened to the casing 1 in any preferred manner, as by bracket 22 at the top of the bell. This bracket is preferably in the form of an angle, having one leg secured by a bolt or screw 23 to the rear wall 1ª of the casing and the other leg soldered to the top wall or head 24 of the bell, as shown in Figs. 2 and 3.

The inner bell 21 is arranged for vertical movement in or with respect to the outer bell 20, and is suspended for this purpose from the outer end of a lever 25 arranged in the casing 1 above the bells as shown in Figs. 2 and 3. The suspension means shown in the drawings comprises a horizontally disposed cross bar 26 arranged between the outer bell and the lever 25 and provided at its center with an upstanding rigid post 27, provided with a hole 28 to receive a stud 29 carried by and extending outward from one side of the lever 25. The stud is provided with an upwardly facing knife-edge bearing 30 between its ends to provide a substantially frictionless connection with the post. As shown in Fig. 6, the opening 28 is slightly larger in diameter than the stud 29, so that by raising the cross bar to lift the post off the bearing 30, the post and the stud may be disconnected. To prevent displacement of the structure when the parts are assembled, a guard strip 31 is fastened by screw 32 to the stud, and extends inward over the bearing 30.

The cross bar 26 extends beyond the sides of the stationary bell 20 and is provided with a pair of depending rods 33, 33, which extend downward along the outside of the stationary bell to a point well below the lower edge of the same, as shown in Fig. 2. Here the rods are secured to a cross-member 34 to which the lower end of the movable bell 21 is secured as by soldering, as shown in Fig. 2. The cross-member 34 is provided with an opening within its border, to receive the lower end of the bell, and thus open the bell to the tank or receptacle 19.

The mounting for the lever 25 comprises a bracket plate 35 secured by screws or bolts 36, 36 to the top wall 1ᵇ of the casing, and extending downward therefrom as shown in Figs. 2 and 3. The depending portion of the bracket is bifurcated to provide a pair of arms 37, 37 between which the lever 25 is located. The lower ends of these arms are turned upward on one side of the bracket as shown in Fig. 2 to provide supports for the fulcrumed elements 38, 38 of the lever. These elements are preferably shaped to provide knife-edge bearings at their lower edges, and the upturned portions of the bracket arms are so formed as to accommodate these knife edges and automatically center the same in the supports. The elements 38 are held from upward displacement by sleeves 39, located within the upturned portions of the bracket arms. These sleeves are preferably held in place by bolts or screws, and they are provided between their ends with concave grooves which conform to the curvatures provided at the upper edges of the fulcrum elements as shown. The fulcrum elements are at the opposite ends of a cross member 40, which is suitably secured to the lever 25, and extends on opposite sides of the same, as shown in Fig. 3. The bells are located on one side of the fulcrum of the lever. The opposite end of the lever is weighted as at 41 to counterbalance the weight of the movable bell 21 and its connected parts.

The pointer 11 is at the lower end of an arm 43 which is connected to and carried by a plate 44 fastened by nut 45 to the cross member 40 of the lever so that the pointer will swing with the lever in the movement thereof through the differential pressure occurring within the bells. The arm 43 is provided with an outwardly extending offset connection 43ª so as to position the pointer 11 outward over the face of the scale 10. The plate 44 is provided with a downwardly inclined portion 46 to the lower end of which is secured a weight 47 to counter-balance the differential force on the head of the movable bell. In the scale shown in the drawings, the zero mark is at one end. The weight 47 causes the extension 46 to assume a vertical position, and thus bring the pointer 11 to the zero mark when there is no difference of pressures within the bells. At this time, the inner bell 21 will be at the extreme end of its upward movement and the lever 25 will occupy the position indicated by dotted lines a in Fig. 2.

To connect the interior of the bells above the liquid levels therein with the sources of pressure, the difference between which is to be indicated on the scale 10, I provide a pair of tubes 48, 49, which as shown in Fig. 2 extend up through the bottom wall of the casing 1, and the bottom of the tank or container 19 into the respective bells. If desired, the tube 48 for the stationary bell could be tapped into the bell through the wall thereof above the tank 19. The outer or stationary bell 20 is provided at one side with a tubular portion 50 to accommodate the tube 48, by which arrangement the diameter of the bell may be reduced. The tubes where they extend through the bottom wall of the tank and the casing are provided with suitable fittings, as shown to secure leak-proof connections. 51 indicates an outlet nipple whereby the tank may be drained when desired. A cap 52 is employed to normally close the outer end of the nipple.

53 indicates a tube through which the tank 19 may be filled from the top of the casing. This tube extends through the top wall 1ᵇ of the casing, and is provided at its upper end with a closure cap 54 as shown in the drawings. The lower end of the filling tube terminates above a level indicating member 55 which is preferably in the form of an angle strip located in the tank 19, and secured to the side wall thereof at one side of the stationary bell. The cover 2 is provided with an additional sight opening 56 through which the level indicator may be seen and thus permit the operator to determine when the level in the tank reaches the proper height, or needs replenishing. With the transparent plate 7 extending over the entire front of the casing, said plate is common to both sight openings in the cover and requires only one plate for both openings.

The gauge device shown and described operates as follows: The differential factor to be indicated by my improved gauge comprises a drop between the furnace and the up-take, across economizers and pre-heaters, through air filters, and all other equipment, in which the resistance of air or gas flow is to be measured. The tube 49 is connected to the source of lower pressure while the tube 48 is connected to the source of higher pressure. With the low pressure acting within the movable bell 21 below the head thereof, and the high pressure acting on the movable bell above and on the outside of its head, causes the bell to move down a distance commensurate with the difference between these pressures. The bell 21 in its downward movement through the rods 33 and the other means which connects the bell with the lever 25 causes a downward movement of the lever to substantially the same extent as the bell. This movement of the lever is translated to the pointer 11, which by the long arm 43 multiplies the movement and indicates it on the scale 10. An increase in pressure with the movable bell 21 and a decrease in pressure within the stationary bell 20 will cause a rising of the inner bell with a consequent movement of the pointer. In the downward movement of the inner bell, the pointer is moved over the scale away from the zero mark, whereas in the upward movement of the inner bell the pointer approaches said mark. In either case, the distance that the pointer stands from the zero mark will by the graduations employed on the scale indicate accurately the difference between the pressures within the bells.

While I have shown and described herein the power unit in the form of sealed gasometer bells, it is to be of course understood that I may employ any other desired form of actuating members or elements, such as diaphragms, bellows or other expandible and contractible means which will respond to variations in pressure. Consequently, in the appended claims, I intend to include in the terminology with respect to the power unit all types of members or elements which may be employed to carry out the purposes and objects of my invention.

The arrangement of the bells one within the other is an important feature of my invention in that it permits the differential pressure movement to be located entirely to one side of the fulcrum of the lever, which arrangement is far simpler and less complicated than an arrangement which requires the use of bells or other pressure responsive parts suspended or arranged on opposite ends of the fulcrum of the lever. With the bells located one within the other, and arranged and cooperating in accordance with my invention, the gauge device is rendered more compact and unitary in its construction. This not only facilitates the assembling of the parts at the factory but also enables a very compact and completely finished product to be produced.

The details of structure shown and described may be variously changed and modified without departing from the spirit and scope of my invention.

I claim as my invention:

1. In a differential pressure gauge of the character described, indicating means, and an operating mechanism therefor comprising a lever fulcrumed between its ends, a pair of gasometer bells arranged one within the other and located to one side of the fulcrum of said lever, the outer bell being stationary and the inner bell being movable and connected with the lever for actuating the same, a receptacle at the lower ends of the bells and containing a body of liquid to provide a seal therefor; and tubes extending upward into the interiors of the bells through the bottom of the receptacle whereby the bells may be connected with sources of pressure the difference between which is to be indicated by the gauge, the outer bell being provided at one side with a tubular extension to accommodate the tube extending into said bell.

2. A pressure gauge of the character described, comprising a substantially rectangular outer casing and a removable cover for the front of the same, a pointer and an operating mechanism therefor located within the casing to the rear of the cover, said cover having a pair of independent sight openings arranged one above the other, one for the pointer and the other for the interior of the casing, and a single transparent plate interposed between the cover and the casing and being common to both sight openings.

3. In a pressure gauge, an operating mechanism therefor including a lever fulcrumed between its ends, pressure responsive device located to one side of the fulcrum of the lever and connected with the lever for operating the same and constituting the sole power unit, for the gauge, a counterbalance for said power unit on the opposite end of the lever, a pointer disposed transverse to the lever and connected therewith at or adjacent the line of its fulcrum, and a gravity load for the pointer.

4. In a pressure gauge, indicating means and an operating mechanism therefor including a gasometer bell, a receptacle containing a body of liquid to provide a seal for the lower end of the bell, and a liquid level indicator for the receptacle consisting of a strip secured to one of the walls thereof and extending inward therefrom at the height required to indicate the desired normal level within the receptacle.

LEWIS M. ELLISON.